July 16, 1940.  W. C. LAUGHLIN  2,207,988
SEAL FOR FILTER BED CLEANERS
Filed Nov. 2, 1938  3 Sheets-Sheet 3
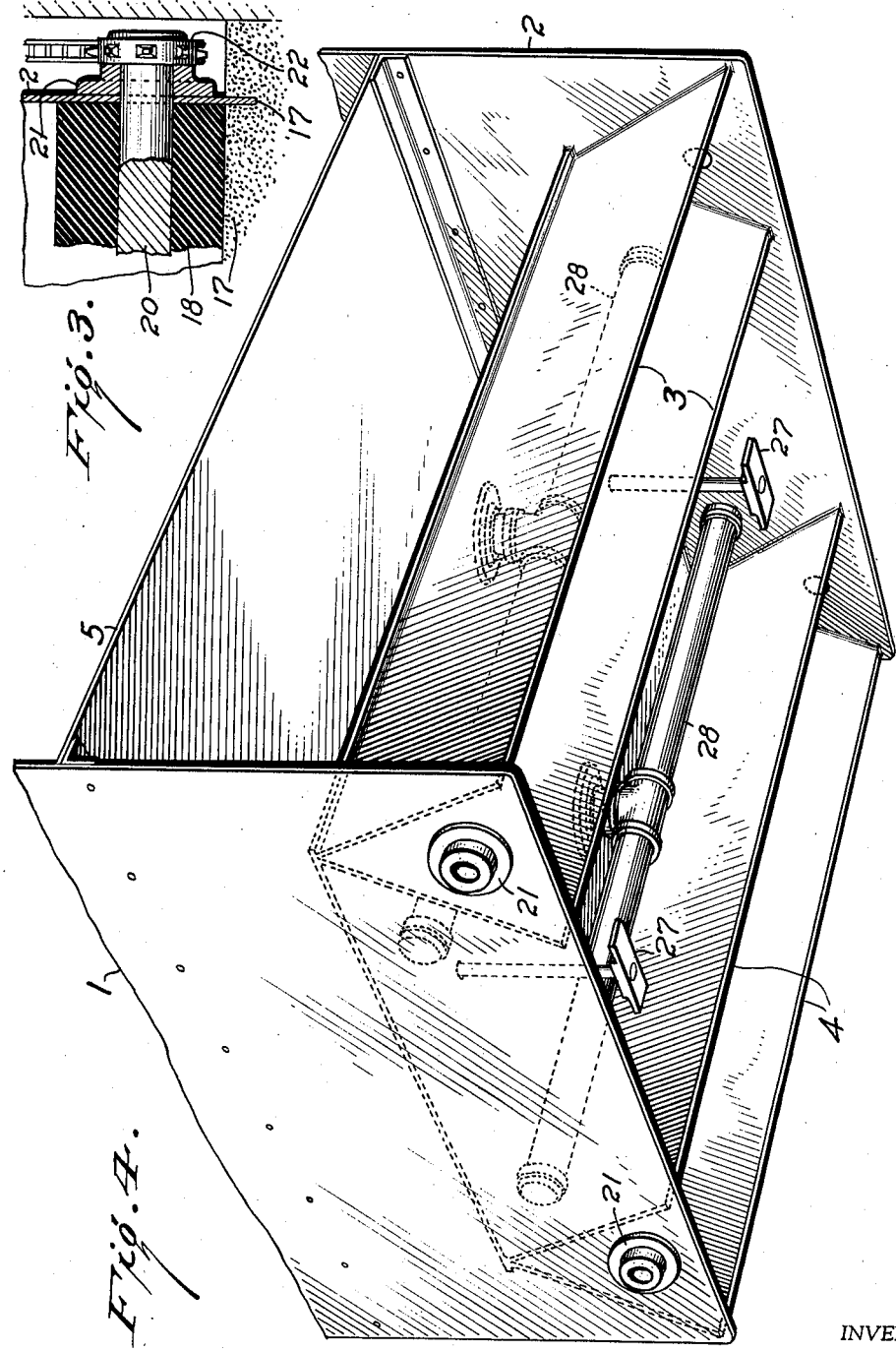
INVENTOR.
BY WILLIAM C. LAUGHLIN,
ATTORNEY.

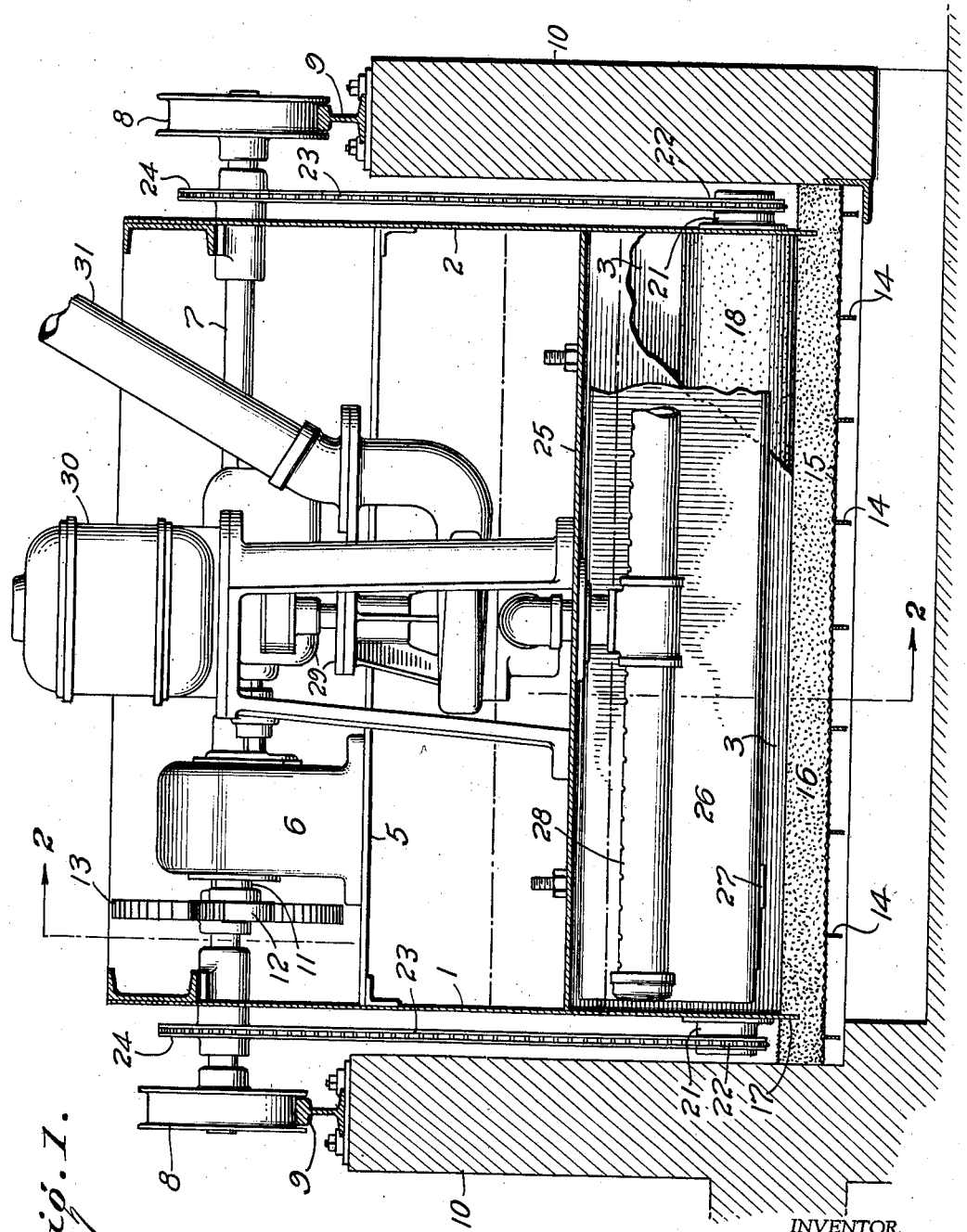

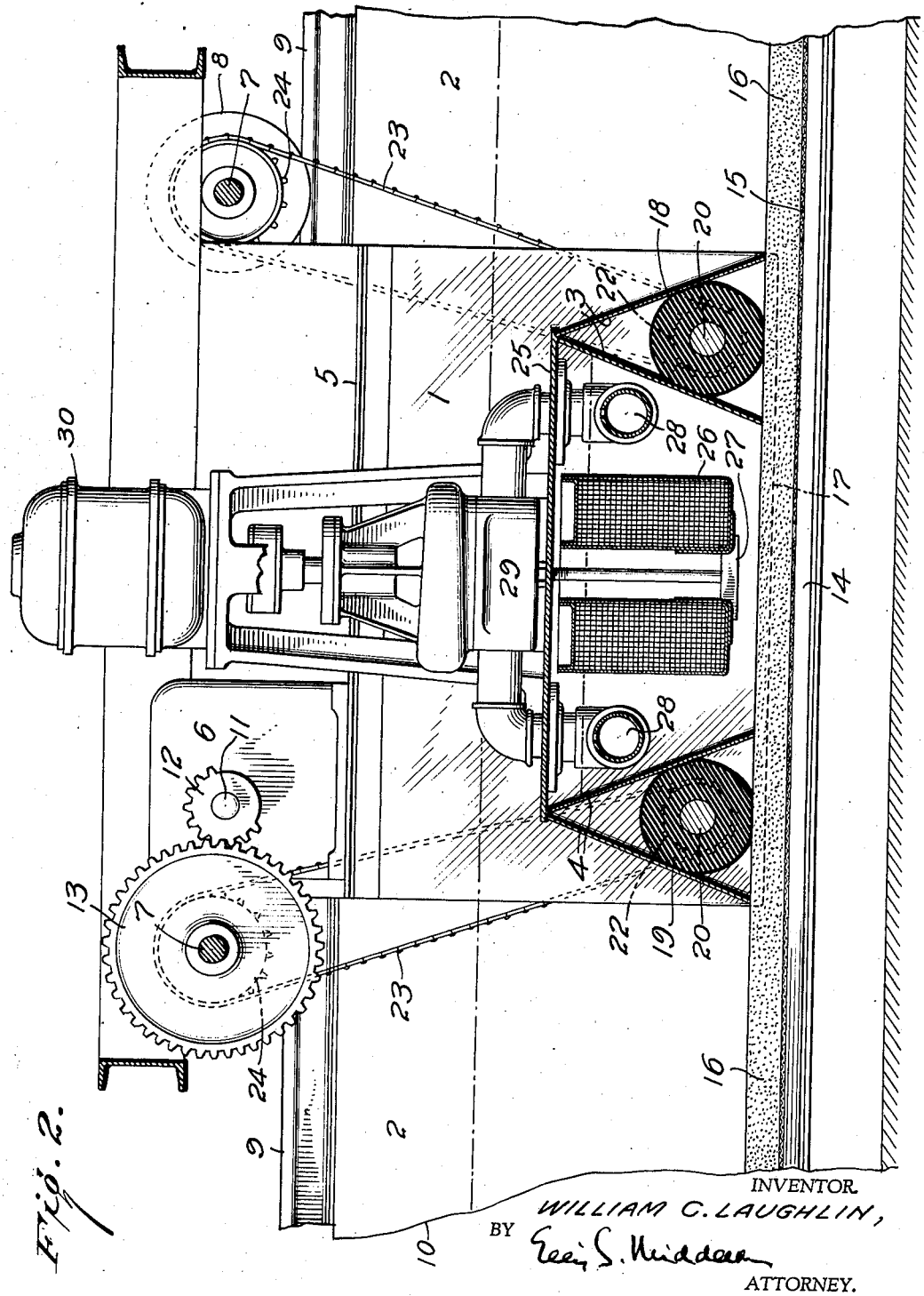

Patented July 16, 1940

2,207,988

UNITED STATES PATENT OFFICE 2,207,988

SEAL FOR FILTER BED CLEANERS

William C. Laughlin, New York, N. Y., assignor to Filtration Equipment Corporation, Bound Brook, N. J., a corporation of Delaware Application November 2, 1938, Serial No. 238,371

9 Claims. (Cl. 210—128)

This invention relates to cleaning devices for submerged filters of loose material of the type used in clarifying water or sewage, and more particularly to traveling cleaning devices of this type which travel over the surface of the filter bed either continuously or intermittently and constitutes an improvement upon the mechanism shown and described in the co-pending application of Charles E. Fraser, Serial No. 152,771. Objects of the invention are to increase the effectiveness of the cleaner and particularly to prevent contamination of filtered effluent by admixture with dirt removed from the filter during the cleaning operation. A more specific object toward the accomplishment of these purposes is to provide a traveling cleaning device having a seal which will effectively prevent the influx or escape of water or sewage from under the lower edges of the cleaner during the cleaning operation.

In rapid filtration processes and particularly in the clarification of sewage and industrial wastes by rapid filtration, it is necessary to use a relatively thin bed of filtering material such as sand and relatively high rates of flow. In such an installation, the thin bed of filtering material, therefore, must hold back and retain relatively large amounts of solid material per unit of time, and without a more or less continuous cleaning, it soon becomes clogged and offers a greatly increased resistance to the flow of water therethrough. This resistance, in turn, cuts down the rated capacity of the filter or else increases back pressure to a point where a much greater operating head is necessary.

By reason of the necessity of more or less continuous cleaning, modern submerged filters both of the upflow and downflow type are so designed and constructed that the clarified effluent from the filter passes out of the filter chamber at a level above that of the filter bed, thus ensuring that the filter will be covered by one or two feet of liquid at all times. The flow of impure water or sewage to be clarified reaches the influent side of the filter bed under a hydrostatic head or pressure which represents a sufficient water head above that of the outflow to overcome the flow resistance due to the filter, and thus causes the liquid to flow through the filter bed by reason of its hydrostatic pressure. A traveling cleaning device is mounted over the filter bed and moves on an arm or trackway and moves continuously or intermittently along the length of the filter bed.

The cleaner is provided with a cleaning mechanism for agitating the sand or other loose material of the filter bed and for removing the accumulated dirt and impurities therefrom, preferably by a washing operation, and for discharging the impurities from the cleaner in the form of an aqueous suspension known as wash water. There are a number of known cleaning devices of this nature which are now used for sand filters of the submerged type, some of which operate merely by mechanical agitation of the sand, others by the injection of jets of water into the sand and still others by the agitation of magnetite sand or other magnetic material by means of an intermittently operating electromagnet. However, all the cleaning devices of which I am aware operate upon the principle of agitating successive portions of the filter bed and withdrawing the accumulated impurities therefrom in the form of a water suspension, and it is an object of my invention to improve the effectiveness of any cleaner of this type by preventing admixture of the wash water used therein with the filtered effluent.

To this end, the invention contemplates a traveling cleaner for sand filters which includes a movable cleaner tank adapted to travel over the filter bed, to wash a portion of the bed and remove the impurities thus separated, with deformable rollers at each end of the cleaner tank making sealing contact with the walls of the tank and with the filter bed. In contradistinction to the rigid rollers of the above-mentioned Fraser application, the present invention contemplates the use of deformable rollers of rubber or the like so that not only do they make a water lubricated wiping contact with the cleaner tank walls due to the fact that they are submerged in the liquid, but at the same time, due to the position of the equipment with relation to the bed, the rollers will be deformed at the bed's surface so as to make a substantially flattened plane surface contact therewith as the rollers roll over the bed with the cleaner tank.

The invention further contemplates the detailed arrangement, combination and construction of parts more fully hereinafter described and shown in the accompanying drawings.

In the drawings—

Fig. 1 is an elevation of a device embodying the invention, having one pair of end walls of the cleaner tank removed;

Fig. 2 is a side view along the line 2—2 of Fig.1;

Fig. 3 is a detailed view of one end of a rubber sealing roller;

Fig. 4 is a bottom perspective view showing the details of construction of the cleaner tank.

Referring now with particularity to a preferred embodiment of the invention illustrated, the cleaner tank consists of side walls 1 and 2 enclosing therebetween a divergent pair of end walls 3 and a similar pair 4 at the other end thereof. A top wall 5 connected with the side walls 1 and 2 serves to support the driving motor 6 and associated mechanism which latter includes a shaft 7 to the ends of which traction wheels 8 are secured and which move upon tracks 9 mounted above the side walls 10 of the sewage tank. As shown, the stub shaft 11 from the prime mover 6 is provided with a mutilated gear 12 meshing with a larger gear 13. Consequently, rotation of the prime mover in either direction will, through the instrumentalities of gears 12 and 13, drive the entire cleaner mechanism intermittently over the filter bed in either direction.

The filter bed may consist of a grid 14 carrying a coarse mesh 15 adapted to receive and hold thereon a desired depth of sand 16 of any desired variety, either magnetic or not, as the case may be.

It will be observed that in view of the fact that the side walls 1 and 2 of the cleaner tank extend a substantial distance into the filter bed 16 as at 17, leakage of dirty water from above the filter bed into the cleaner chamber is thus prevented at that point.

Within each pair of divergent end walls 3 and 4 of the cleaner tank are sealing rollers 18 and 19. These rollers are of deformable material, preferably rubber or the like, so arranged as to make wiping contact with the inside of the divergent walls within which they are located and also wiping sealing contact with the end walls of the cleaner tank. These rollers are mounted upon a shaft 20 carried in bearings 21 and provided with sprockets 22 which, through chains 23 and sprockets 24 mounted on drive shafts 7, serve to rotate the rollers.

The rollers themselves are of a size sufficient to not only make the necessary wiping contact with the pairs of divergent walls 3 and 4 but also to make rolling contact with the filter bed 16. Due to the fact that the invention contemplates rollers of deformable nature such as soft rubber or the like, they will be flattened into a substantially plane contact with the filter bed as they move thereover and thus prevent leakage of dirty water from outside the cleaner tank thereinto.

It is to be understood that in the preferred form of the invention, the cleaner mechanism is principally supported on its trackway 9 and only a sufficient weight bears on the soft rollers 18 and 19 to cause them to slightly flatten. However, these rollers are not relied upon for traction.

Within the main body of the cleaner tank is a plate 25 from which is suspended an electromagnet 26 on an adjustable support 27 so that the position of the magnet may be adjusted with relation to the surface of the bed 16. The operation of this magnet is substantially similar to the operation of the electromagnet referred to in the Laughlin Patent 1,872,759 and, hence, will not be described in detail here. Suffice it to say that this magnet is adapted to be intermittently energized so that where the filter bed is of magnetite sand, a portion of such dirty sand will be withdrawn from the bed in an upward direction and the adhering dirt cleaned or sprayed therefrom. When the magnet is de-energized, the cleaned sand will, under the action of gravity, fall back to its place in the bed. The wash water, including the dirt removed from the sand particles, is then sucked into the top of pipe 28 and under the action of pump 29 driven by motor 30, discharged through the wash water exit 31 for disposal.

It will be noted from the above that the aforementioned construction provides a cleaner tank within which the entrained dirt and impurities may be separated from the filter bed material and removed therefrom. This part of the construction is well known and is illustrated merely as one type of cleaning mechanism which may be employed.

The important feature of the invention is the fact that this cleaner tank is at all times sealed against the entrance of unfiltered sewage or other liquid being purified so that at no time may such dirty water reach the clean effluent below the filter bed except by passage through the bed which, of course, has the effect of cleaning the liquid of its impurities. The sealing rollers at each end of the cleaner tank effectively prevent the passage of this dirty water past the ends of the tank. The tank is entirely driven by the prime mover 6 mounted on the carriage above the tank, although the parts are so arranged that sufficient weight is placed upon the rollers to cause them to be deformed as they make contact with the filter bed. This deformation results in a substantial area of flat contact between the roller and the filter bed and, consequently, prevents leakage of liquid at this point. Due to the fact that the influent level is above the plate 25, the rollers are at all times submerged in the liquid being filtered and a water lubricated wiping contact is made between them and the end and side walls, thus not only insuring a seal but reducing the drag due to friction to a maximum extent.

Obviously any other type of actual cleaner mechanism other than the specific magnetic type shown, may be used with the present invention, as in all cases it is important that the cleaner tank be sealed against leakage thereinto of dirty influent.

While the invention has been shown and described with particular reference to specific embodiments, it is to be understood that it is not to be limited thereto but is to be construed broadly and restricted only by the scope of the claims.

I claim:

1. A traveling cleaner for sand filters comprising in combination a filter bed, a movable cleaner tank adapted to travel over the filter bed and provided with means for removing impurities washed from the bed, and rotative sealing means extending across the ends of the tank and making sealing contact with the side and end walls of the tank to prevent passage of fluid therebetween, the periphery of said rotating sealing means comprising a material capable of temporary deformation, a part of the said periphery making a sealing contact with the filter bed.

2. The combination of claim 1 in which the deformable portion of the sealing means in contact with the filter bed is rubber.

3. The combination of claim 1 in which the periphery of the sealing means is rubber, making substantially plane surface contact with the filter bed.

4. The combination of claim 1 in which the sealing means includes a rubber roller.

5. The combination of claim 1 in which the sealing means makes wiping contact with a wall of the cleaner tank.

6. A traveling cleaner for sand filters comprising in combination a filter bed, a movable cleaner tank adapted to travel over the filter bed and provided with means for removing impurities washed from the bed, said cleaner tank having two diverging walls at each end thereof separated toward the filter bed, a sealing roller capable of temporary deformation within each pair of walls making wiping contact therewith and with the sides of the tank and a deformed flat rolling sealing contact with the filter bed.

7. A traveling cleaner for sand filters comprising in combination a filter bed, a movable cleaner tank adapted to travel over the filter bed and provided with means for removing impurities washed from the bed, said cleaner tank having two diverging walls at each end thereof separated toward the filter bed, side walls contacting with the divergent walls, sealing means to prevent passage of fluid between said side walls and the filter bed, and a deformable rubber sealing roller in the space between each pair of divergent walls making wiping contact therewith and with the side walls and a deformed flat rolling sealing contact with the filter bed.

8. The combination of claim 7 with means to move the cleaner tank and rollers over the filter bed.

9. The combination of claim 1 in which the periphery of the rotating sealing means is of resilient material.

WILLIAM C. LAUGHLIN.